Jan. 21, 1958  K. H. STEVENS  2,820,963
RADIO DIRECTION FINDING CIRCUIT
Filed Nov. 27, 1953
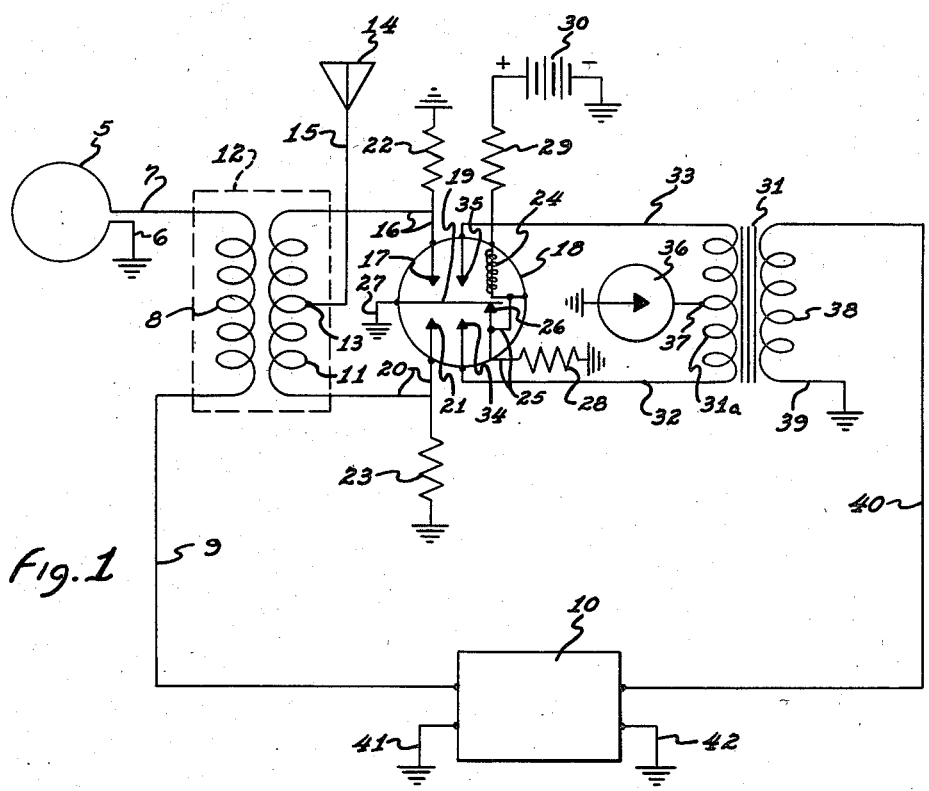
Fig. 1
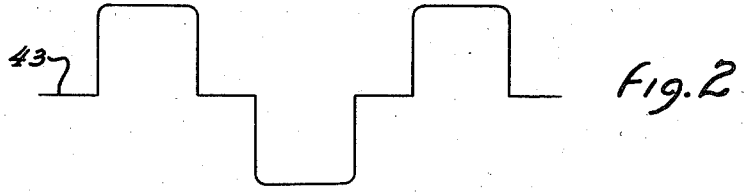
Fig. 2
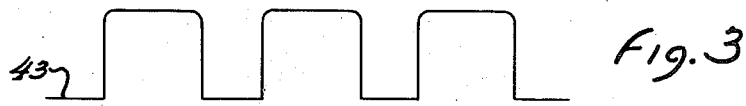
Fig. 3
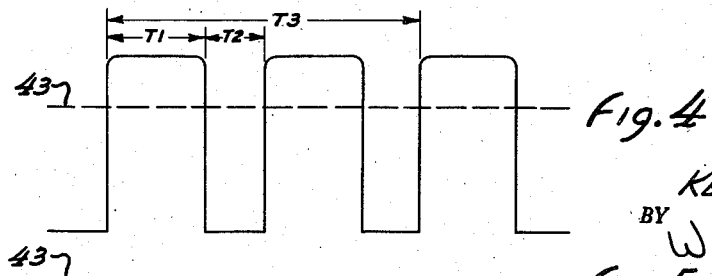
Fig. 4
Fig. 5
INVENTOR.
KENT H. STEVENS.
BY William S. Grove
ATTORNEY.

United States Patent Office 2,820,963
Patented Jan. 21, 1958

2,820,963

RADIO DIRECTION FINDING CIRCUIT

Kent H. Stevens, Phoenix, Ariz., assignor to Aircraft Specialty Lines, Phoenix, Ariz., a corporation of Arizona Application November 27, 1953, Serial No. 394,793

2 Claims. (Cl. 343—120)

This invention pertains to improvements in radio direction finding circuits and is particularly directed to such circuits in which a vibrating reed or vibrator is put to a distinctly new use.

One of the objects of this invention is to provide an improved radio direction finding apparatus for use in aircraft, particularly light aircraft.

Another object of this invention is to provide an improved radio direction finder which indicates by means of a needle on a meter face the direction of a radio beacon relative to the heading of the aircraft.

A further object of this invention is to provide an improved radio direction finding system in which the beacon site is found by merely heading the aircraft directly toward the site by maintaining a zero reading on the indicator needle.

It is also an object of this invention to provide a radio direction finding circuit with a vibrator which alternately selects one of two radio frequency signals of an arbitrary amplitude for insertion into a radio receiver while a second set of contacts is switched at the same time to give an output that bears a fixed relation to the input and depending on the relative amplitudes of the two input signals the output from the second set of contacts may appear as either a positive or negative direct current signal.

Further features and advantages of this invention will appear from a detailed description of the drawings in which:

Fig. 1 is a wiring diagram of a radio direction finding circuit incorporating the features of this invention.

Fig. 2 shows the output waveform of the signal from the receiver with off-course signal.

Fig. 3 shows the output waveform of the signal of the current in the indicating meter with off-course signal.

Fig. 4 shows the output waveform of the signal from the receiver with on-course signal.

Fig. 5 shows the output waveform of the signal of the current in the indicating meter with on-course signal.

As exemplary of one embodiment of this invention there is shown in Fig. 1 a radio direction finding circuit having a loop antenna 5 connected to ground through lead 6 and connected through lead 7 to one terminal of winding 8, the other terminal of the winding 8 being connected through a lead 9 to the loop antenna input of the radio receiver 10. The second winding 11 of the coupling transformer 12 has an intermediate tap 13 and the turns each side of the center tap are bucking. The whip antenna 14 is connected to the center tap 13 through the lead 15. Preferably the ratio of winding 8 to the second winding 11 is equal to one to seven.

One end of the second winding 11 is connected through a lead 16 to a contact 17 of the vibrator 18 having the vibrating contacting reed 19 and the other end of the second winding 11 is connected through a lead 20 to a contact 21 on the opposite side of the reed from contact 17. Leads 16 and 20 are each connected to ground through suitable resistors, such as the 2200-ohm resistors 22 and 23.

The vibrating reed 19 is actuated to oscillate at a preferred frequency of 115-cycles-per-second by a direct current energizing circuit comprising the solenoid coil 24 having one end connected through lead 25 to the breaker contact 26 of the vibrator 18. The reed 19 is connected to ground through lead 27 while lead 25 is connected to ground through a suitable 150-ohm resistor 28. The other end of the solenoid coil 24 is connected through a suitable 35-ohm resistor 29 to a suitable source of direct current, such as the battery 30 which in turn is connected to ground.

A suitable output transformer 31 is provided having the winding 31a with the ends thereof connected through leads 32 and 33 to the respective contacts 34 and 35 on opposite side of the reed 19 in the vibrator 18. A suitable zero-center direct current galvanometer 36 is connected in series with ground and an intermediate tap 37 on the winding 31 of the output transformer. The output winding 38 of the output transformer has one end connected to ground through lead 39 and its other end connected through lead 40 to the audio output of the radio receiver 10, the receiver being suitably grounded through leads 41 and 42.

It will thus be seen that as the reed 19 is vibrated at the desired frequency of 115-cycles-per-second, leads 16 and 32 and leads 20 and 32 will be alternately connected and disconnected. It can be seen that if there is a difference in amplitudes of the two inputs there will appear a square wave modulation on the radio frequency waveform at the frequency of the vibrator with the phase dependent on which signal is the largest, Figs. 2 and 3. If the two signals are of equal amplitude, then the modulation will be twice the frequency of the vibrator and the actual waveform will be governed by the time the reed is making the transition from one set of contacts to the other and the time it remains on the contacts. Fig. 2 shows the output waveform of the signal from the receiver with off-course signal while Fig. 3 shows the waveform with off-course signal of the current in the indicating galvanometer or meter 36. Fig. 4 shows the output waveform of the signal from the receiver with on-course signal while Fig. 5 shows the waveform with on-course signal of the current in the indicating meter 36. The zero direct current level is indicated by lines 43 in Figs. 2, 3, 4 and 5.

Referring to Fig. 4, the input to the vibrating system is a continuous wave signal. The value T1 is the time the reed 19 is on the contacts. The value T2 is the time the reed 19 is in transit from one set of contacts to the opposite set of contacts. Preferably the ratio of T1:T2 is 5.6:3.0. $T3=1/115$ seconds.

Since the detector in a receiver puts out an audio signal depending on the modulation of the radio frequency waveform, the two above mentioned conditions of unequal and equal amplitudes will give an audio output of 115 and 230-cycles-per-second respectively. The amplitude is determined by the total signal present at either contact. The suddenness and high frequency of the switching brings on the problem of high switching transients. The sudden breaking of a current through a coil gives rise to a high voltage transient which will be capacitively coupled to the receiver. The high amplitude sharp pulse may cause a ringing oscillation in a normal receiver. This is eliminated by selecting the proper size resistors to place from the switching contact across the coil so that the circuit is never completely open. The resistor is selected to be as low as possible without affecting the static performance of the system. This could also be eliminated by means of a static shield between windings in the coil of the coupling transformer 12. In the output transformer 30 the same problem is not present since the meter movement is not capable of following a transient due to its internal time constant.

In the present application the signals to the meter are of special and different character from systems used in the past. In the presence of an error signal there is 115-cycles-per-second present in the output. There is not present any negative or positive direction, the direction of current through the meter 36 being determined solely by the phase of the 115-cycles-per-second audio relative to the reed and contact sequence. The amplitude of the 115-cycles-per-second modulation is determined by the difference between the two switched signals in the input and the phase depending on which is larger.

In this arrangement the direction finding system applies a modulation to the radio frequency envelope that can be handled by the audio system in a practical communication receiver. This system operates best on a continuous wave signal and can operate just as well with erratic modulation since it is practical to filter out frequencies other than the 115-cycles-per-second desired. In this arrangement the vibrator is used for synchronous detection of the signal without dependence on modulation in the transmitted signal. Further, in this system the input circuitry with associated resistors provides a highly efficient means for switching with a vibration without high transients. Also, the vibrator is utilized in this system for switching on radio frequencies with synchronous demodulation accomplished with second contacts.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters patent is:

1. In a radio direction finding circuit, a radio receiver, a loop antenna having one end connected to ground, a coupling transformer having a primary winding with one end connected to the other end of said loop antenna and the other end of said primary winding being connected to the loop antenna input of said radio receiver, a secondary winding in said coupling transformer having a center tap and bucking turns each side thereof, a whip antenna connected to said center tap, a first resistor interconnected between one end of said secondary winding and ground, a second resistor interconnected between the other end of said secondary winding and ground, a vibrating reed connected to ground, electrically energized means to cause said reed to vibrate at a predetermined frequency, an engageable contact on one side of said reed connected to one end of said secondary winding, an engageable contact on the other side of said reed connected to the other end of said secondary winding, said contacts being alternately engaged by said reed when vibrating to alternately connect one end and then the other end of said secondary winding to ground.

2. In a radio direction finding circuit, a radio receiver, a loop antenna having one end connected to ground, a coupling transformer having a primary winding with one end connected to the other end of said loop antenna and the other end of said primary winding being connected to the loop antenna input of said radio receiver, a secondary winding in said coupling transformer having a center tap and bucking turns each side thereof, a whip antenna connected to said center tap, a first resistor interconnected between one end of said secondary winding and ground, a second resistor interconnected between the other end of said secondary winding and ground, a vibrating reed connected to ground, electrically energized means to cause said reed to vibrate at a predetermined frequency, an engageable contact on one side of said reed connected to one end of said secondary winding, an engageable contact on the other side of said reed connected to the other end of said secondary winding, said contacts being alternately engaged by said reed when vibrating to alternately connect one end and then the other end of said secondary winding to ground, an output transformer having a secondary winding, an engageable output contact on one side of said reed connected to one end of said output transformer secondary winding, an engageable output contact on the other side of said reed connected to the other end of said output transformer secondary winding, a zero-center direct current galvanometer connected in series with ground and an intermediate center tap on said output transformer secondary winding, and a primary winding in said output transformer having one end connected to ground and the other end connected to the audio output of said radio receiver.

References Cited in the file of this patent

UNITED STATES PATENTS

| | | |
|---|---|---|
| 2,271,550 | Hermanspann et al. | Feb. 3, 1942 |
| 2,310,052 | Bartholy | Feb. 2, 1943 |
| 2,605,465 | Brailsford et al. | July 29, 1952 |